United States Patent [19]

Taboada et al.

[11] 4,102,610
[45] Jul. 25, 1978

[54] CONSTANT VOLUME SEAL-FREE RECIPROCATING PUMP

[76] Inventors: John Taboada, 159 Ebbtide, San Antonio, Tex. 78227; Marvin H. Lindsey, 3911 E. Palfrey, San Antonio, Tex. 78223

[21] Appl. No.: 720,465

[22] Filed: Sep. 3, 1976

[51] Int. Cl.² .............................................. F04B 17/04
[52] U.S. Cl. .................................... 417/417; 3/1.7; 128/1 D; 415/214; 318/128
[58] Field of Search ............... 415/214; 417/415, 417; 128/1 D, DIG. 3, 273; 3/1.7; 318/128, 130, 132

[56] References Cited

U.S. PATENT DOCUMENTS

| | | | |
|---|---|---|---|
| 2,481,320 | 9/1949 | Madorsky | 417/417 |
| 2,604,851 | 7/1952 | Archibald | 417/417 |
| 3,293,516 | 12/1966 | Maier et al. | 318/128 |
| 3,348,489 | 10/1967 | Meyer | 417/417 |
| 3,521,794 | 7/1970 | Bijl | 318/130 |
| 3,603,706 | 9/1971 | Cermak et al. | 417/417 |
| 3,629,674 | 12/1971 | Brown | 417/415 |
| 3,819,293 | 6/1974 | Zitzmann | 415/214 |

*Primary Examiner*—C. J. Husar
*Attorney, Agent, or Firm*—Joseph E. Rusz; Arsen Tashjian

[57] ABSTRACT

A reciprocating pump having a piston completely enclosed by and moving within a cylinder. The pumping action is provided by the interaction between a magnetic component embedded in the piston and an external varying magnetic field produced by a permanent magnet, solenoid, etc. The necessary back-and-forth motion is produced by momentarily offsetting the gravitational force by the spatial driving or time variation of the magnetic field and a suitable combination of valves is provided to control the fluid flow through the cylinder.

1 Claim, 4 Drawing Figures

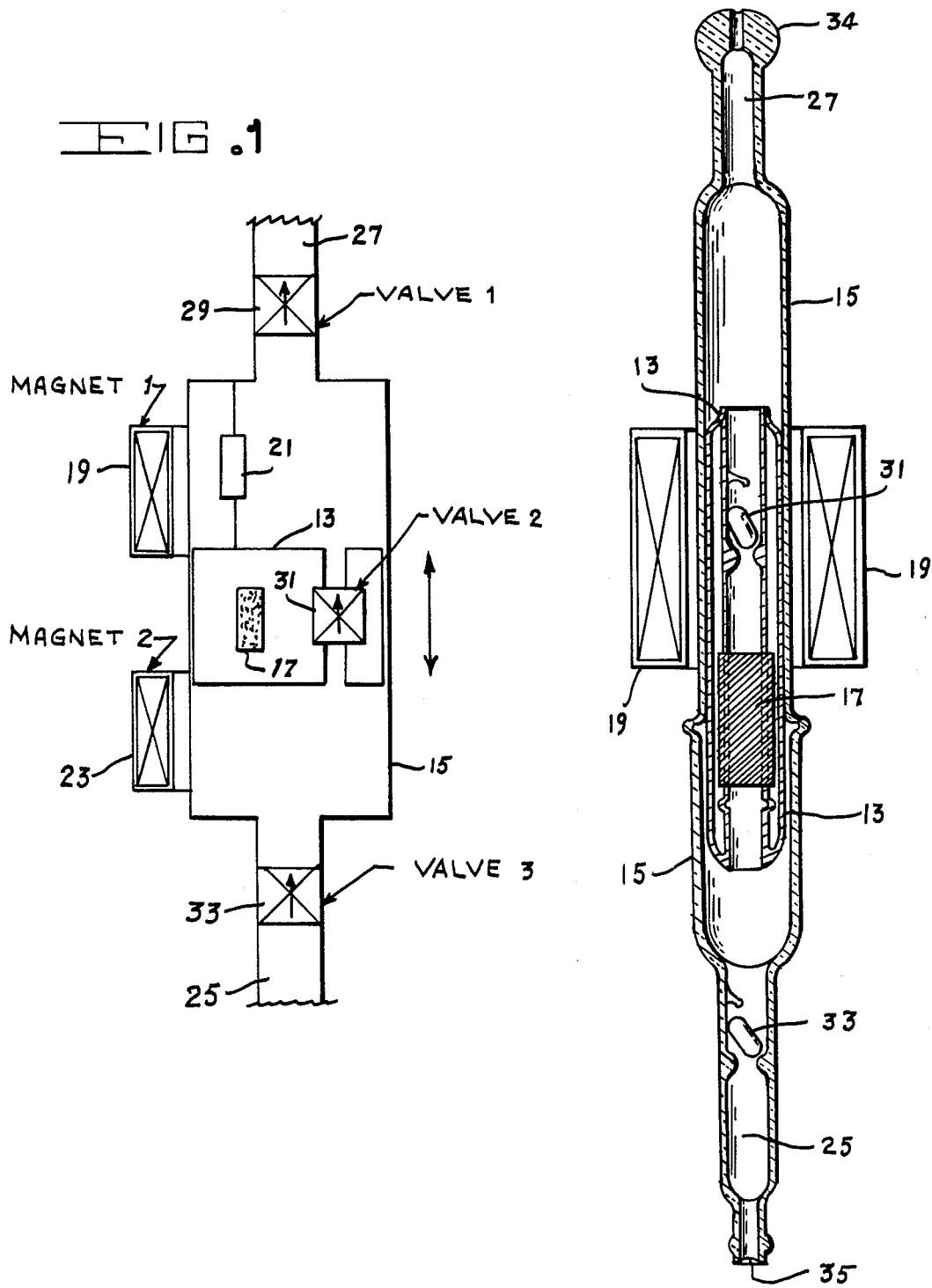

CONSTANT VOLUME SEAL-FREE RECIPROCATING PUMP

STATEMENT OF GOVERNMENT INTEREST

The invention described herein may be manufactured and used by or for the Government for governmental purposes without the payment of any royalty thereon.

BACKGROUND OF THE INVENTION

This invention relates to a magnetically operated constant volume, seal-free reciprocating pump and, more particularly, the invention is concerned with providing a closed system pump having no mechanical coupling between the completely enclosed piston and an external driver allowing contamination free handling and movement of biological fluids as well as fluids used in chromatography, spectroscopy and radiation analysis.

Heretofore, commonly known mechanisms for producing reciprocating motion are usually mechanical and require a reciprocating member such as a crank and connecting rod attached to a piston which necessitates the use of many close fitting parts and include sealing elements to prevent loss or contamination of the pumped fluid. In recent years, various electromechanical pumping devices have been proposed which operate on the principle of magnetics. One commonly used pumping construction includes a piston of magnetic material which is pulled into a magnetic field by a selectively energized solenoid coil. Such structures generally require the use of coil compression springs or the like to cause the return of the piston to its original position after the solenoid coil is deenergized. This creates a serious problem because the springs tend to weaken after extended use and corrosive liquid in contact with the springs can cause damage and failure to occur.

Another problem occurs when it is necessary to handle large volumes of liquid with completely leak-free operation and at the same time to prevent contamination of the pumped fluid by the pump components or the external environment. This requires completely leak-free operation and the proper choice of structural materials. When the pump is to be used as a surgically implanted heart pump, it is necessary that the parts be baked and that they wear indefinitely. Also, where there is need for remote controlled programmable flow of metered amounts of fluid, it is advantageous to provide a moving part of small inertial mass in order to allow substantially instant response to a magnetic drive signal. The hereinafter described reciprocating pump design effectively solves all of the foregoing problems.

SUMMARY OF THE INVENTION

The present invention is concerned with providing a constant volume seal-free reciprocating pump useful for the safe handling and movement of toxic, corrosive, combustible liquids such as rocket propellants, aircraft fuels, solvents, caustic solutions and acids with no environmental contamination or contamination of the liquid. The pump includes a piston completely enclosed by and moving within a cylinder. The necessary coupling and driving force is provided by the magnetic interaction between a magnetic component embedded or sealed into the piston and an external varying magnetic field produced by a permanent magnet, solenoid, etc. The necessary back-and-forth motion is produced by momentarily offsetting the gravitational force by the spatial driving or time variation of the magnetic field produced by the permanent magnet, solenoid, etc. A spring or second solenoid or magnet can be used to provide the restoring force. One or more check valves are placed in the flow path to obtain the pumping action.

Accordingly, it is an object of the invention to provide a seal-free reciprocating pump wherein the volume of fluid during any time in the pump cycle is constant, that is, constant volume.

Another object of the invention is to provide a constant volume reciprocating pump wherein no mechanical coupling to the external driver is required thereby providing a completely seal-free system.

Still another object of the invention is to provide a constant volume seal-free reciprocating pump having only one moving part, not counting the automatically actuated check valves. The moving part is designed to last indefinitely.

A further object of the invention is to provide a constant volume pump which is capable of operating over a very large range of static pressures.

A still further object of the invention is to provide a constant volume seal-free reciprocating pump completely fabricated of glass. The unit can be easily manufactured and is simple to construct and sturdy and durable.

Another still further object of the invention is to provide a seal-free pump which can be sterilized by baking to high tempertures since it doesn't have seals.

Another further object of the invention is to provide a self-priming pump which is capable of operating with a mixture of gases and liquids. The pump can function in the metering mode over large ranges of capacities depending on the dimensions and magnetic drive timing. It can be easily ganged and can be readily scaled up or down.

These and other objects features and advantages will become more apparent after considering the following detailed description in conjunction with the annexed drawings and appended claims.

BRIEF DESCRIPTION OF THE DRAWINGS

FIG. 1 is a conceptual schematic of the constant volume seal-free reciprocating pump according to the invention showing the piston, cylinder, magnets, valves and spring;

FIG. 2 is a glass version of the pump according to the invention illustrating the completed assembly which is completely inert to the fluid and provides for contamination free operation;

DESCRIPTION OF A PREFERRED EMBODIMENT

Figure 3:
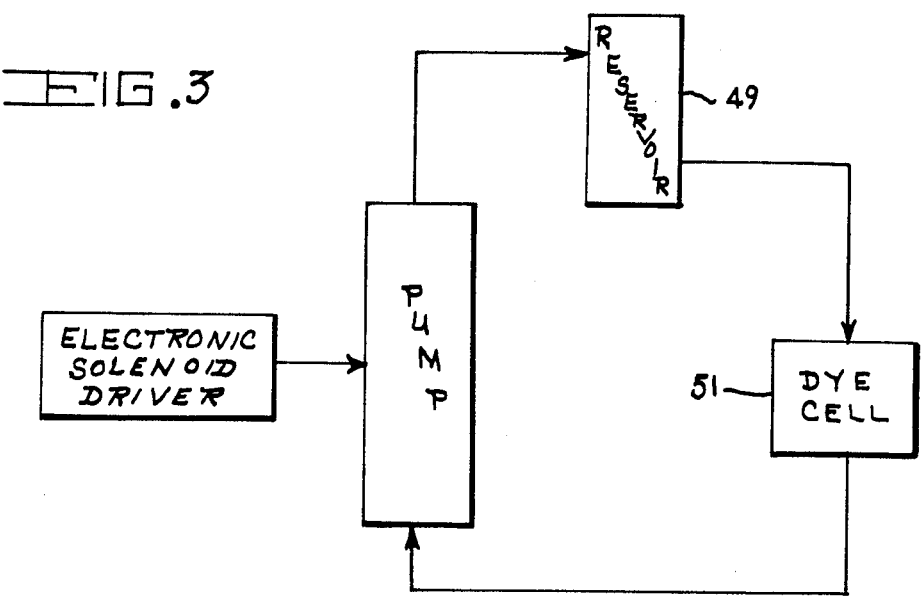
FIG. 3 is a schematic drawing of a system utilizing the all glass version of the pump to maintain a closed circuit flow from a reservoir to a dye cell in a mode-locked laser.

Referring now to the drawings, the constant volume seal-free positive displacement reciprocating pump according to the invention is shown in the conceptual schematic FIG. 1. the device includes a piston 13 completely enclosed by and moving within a cylinder 15.

The necessary coupling and drawing force is provided by the magnetic interaction between a magnetic component 17 in the form of iron core, ferrite bead or permanent magnet embedded or sealed into the piston 13 and an external magnetic field produced by a permanent magnet or solenoid 19. the necessary back-and-forth motion can be produced by momentarily offsetting the gravitational force or alternatively, the force of the spring 21, by the spatial driving or time variation of the magnetic field produced by the permanent magnet or solenoid 19. With a very strong coupling between the elements 19 and 17, and a constant field produced by the element 19, reciprocating motion of the magnet 19 is sufficient to cause the back-and-forth motion of the piston 13. A second solenoid, magnet, etc. 23 can also be used to provide the restoring force. Fluid and/or gases are made to flow from the input port 25 to output 27 by this back-and-forth motion and by the actuation (automatically by flow or pressure gradients or externally by means of magnetic fields) of certain combinations of the check valves 29, 31, and 33. Only one valve is essential if slippage of fluid past the piston is permitted.

Since the pump is driven through magnetic fields, no seals are requred thereby providing absolute containment. All of the components of the pump can be constructed from a material completely inert to the fluid such as glass, stainless steel, Teflon, and other inert durable plastics thus providing, in addition, contamination free operation. In the version of the pump shown in FIG. 2, all of the components of the pump are made of Pyrex or KG-33 Borosilicate glass tubing and rod, except for the soft iron sleeve 17 sealed into the piston 13. Two glass tubes about 14 cm in length having different diameters such that one nearly fits inside the other are chosen. The large diameter tube has an outside diameter of 15mm and an inside diameter of 12.8mm. Using inside and outside metal grinding tools, the tubes are roughly made to fit, the smaller within the larger. A finer grind is then given with fine lapping compound and the tubes then slide smoothly, one within the other, with close tolerance. The smaller diameter tube will serve as the moving piston 13, and the larger diameter tube as the envelope or cylinder 15. First and second glass check valves 31 and 33 are constructed, the first for the piston 13 and the second for the cylinder 15. The piston valve 31 has an incorporated iron sleeve 17 which just fits outside the valve stem, locked in place with a retainer ring stop (not shown) at one end. The piston tube is then cut to a length of about 9.5cm and the piston valve 31 is fused concentrically at both ends. this operation seals in the iron sleeve 17 and completes the piston 13.

A connecting 12/2 ball 34 with 2.5cm stem is fused concentrically to the outlet end 27 of the envelope. At the inlet end 25 of the 14cm envelope, there is fused concentrically a 4cm length of 16mm outside diameter tubing 35 leaving about a 23mm ring stop at the junction. The piston 13 is then inserted with the appropriate direction on the valve seat within the envelope and moved to the end with the connecting ball 33. The envelope valve 33 is then fused concentrically to the open end. The completely fabricated pump is then fired in a glass annealing oven at 1040° F.

Figure 4:
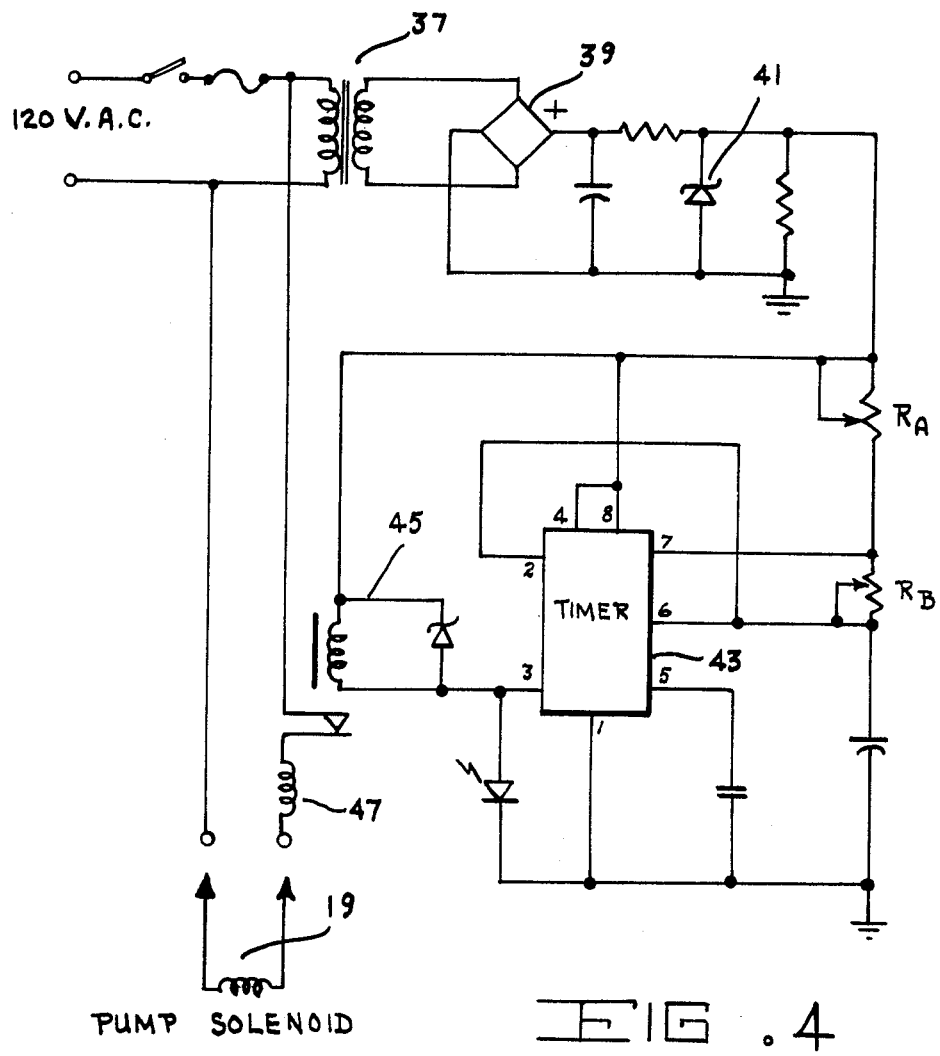
FIG. 4 is a schematic diagram of the driver circuit showing the adjustable potentiometers for setting the period and duty cycles which control the operation of the pump by determining the on and off times of the pump solenoid.

A schematic circuit diagram of the electronic driver and solenoid is shown in FIG. 4. The power supply includes a 6.3 volt transformer 37, a full wave rectifier 39 and a 6 volt Zener diode 41. This powers a timer 43 operating in the astable mode. The output of the IC at pin 3 has a square wave shaped signal which swings between $V_{cc}$ and 0. the period of this oscillation is given approximately by $$T = (\,)R_A + 2R_B)C,$$

where $R_A$, and $R_B$ are 2 megahm potentiometers and C is a fixed 6 microfarad capacitor. The duty cycle is given by:

$$D = R_B/(R_A + 2R_B)$$

The period and duty cycles are adjusted with potentiometers $R_A$ and $R_B$ to achieve optimum operation of the pump such that the solenoid which powers the pump piston 13 is on for a period of time just sufficient for the piston to rise to its maximum and off for a time sufficient for the piston to descend. The amount of liquid transferred in a given stroke can be adjusted by the "on" time. The output of the timer 43 drives a SPDT relay which momentarily connects, during the "on" time. AC power through a voltage dropping variable inductor 47 to the driver solenoid 19. Other schemes for switching the power to the solenoid include the use of a light emitting diode coupled to a light activated SCR. The driver solenoid 19 used to move the piston 13 is preferably made of aluminum and is finned at both ends to minimize the temperature rise. The spool is insulated from the wire which is about 1200 feet of no. 30 magnet wire. The inside diameter of the solenoid 19 allows an air clearance between the pump envelope and the solenoid 19 of about 1mm.

The pump was assembled into a direct pumping application in the circulation of chlorobenzene and Kodak 9740 solution from a reservoir 49 to a laser intra cavity dye cell 51 as shown schematically in FIG. 3. The pump operates smoothly and quietly with the piston rising in about 3 seconds and descending in about 3.5 seconds. A pause was set between pump strokes of about 15 seconds. Maintaining this operation for 3.5 hours produced no perceptable malfunction and the driver solenoid hardly felt warm to the touch at the end of this period. The fluid flow per stroke was determined by allowing it to flow into a graduated cylinder and measuring the change in level after each stroke. In actual measurements the variations per stroke were less than one percent indicating that the pump can function very well in metered applications. During any instant of the "on" cycle the pump can be interrupted instantly by cutting off the AC to the driver, thus allowing the operation, by introducing a rapid feedback signal, in high precision metered applications.

From the foregoing description it can be seen that the seal-free reciprocating pump herein disclosed has indeed solved problems associated with pumping strong solvents such as chlorobenzene with complete containment and lack of contamination. The materials cost of the pump is very low and a wide range of application of this concept can be foreseen by scaling, ganging and design optimizing. Also, it should be noted that the pump can be used in the biomedical field for the contamination free handling and movement of physiological body or biological fluids. Since there is no mechanical coupling to the piston and the pump parts can be baked and wear indefinitely, the device can be used as a surgically implantable heart pump or heat assist. Power for the pump can be fed from an external vest source.

Although the invention has been illustrated in the accompanying drawing and described in the foregoing specification in terms of a preferred embodiment thereof, the invention is not limited to this embodiment or to the particular configuration disclosed. It will be apparent to those skilled in the art that certain changes, modifications and substitutions can be made, particularly with respect to the construction details, without departing from the true spirit and scope of the appended claims.

Having thus set forth the nature of our invention, what we claim and desire to secure by Letters Patent of the United States is:

1. An electromagnetic reciprocating pump for handling biomedical fluids, gases, mixtures of gases and fluids and the like under sterile conditions free of contamination, said pump comprising a vertically oriented hollow elongate cylinder having a check valve at the lower extremity thereof, a tubular elongate piston slidably positioned in said cylinder for vertical movement therein, a magnetic component fixedly attached to said piston for movement therewith, a solenoid coil surrounding the outside of said cylinder in close proximity thereto for producing an external magnetic field, said solenoid coil being positioned immediately above the magnetic component attached to said piston to cause upward movement of said piston by attracting the magnetic component attached thereto, valve means located in said piston for controlling the flow of fluids through said pump in response to cyclic applications of the magnetic field thereto, and a power supply for alternately energizing and deenergizing the solenoid coil producing the external magnetic field including a serially connected transformer and full wave rectifier, a Zener diode connected across said rectifier, a timer operating in the astable mode powered by said power supply, and a relay controlled by the output of said timer for momentarily connecting said power supply to the solenoid coil, such that said piston is caused to move upward in response to magnetic attraction of said magnetic component by the external magnetic field and to move downward under the influence of gravity when the magnetic field is deenergized.

* * * * *